United States Patent [19]
Hollenbush

[11] 3,952,685
[45] Apr. 27, 1976

[54] TOW ROPE DEVICE

[76] Inventor: Richard Lewis Hollenbush, 709 Benton St., Harrisburg, Pa. 17111

[22] Filed: July 30, 1975

[21] Appl. No.: 600,490

[52] U.S. Cl. ............................ 114/235 R; 267/70
[51] Int. Cl.² .................................. B63B 21/56
[58] Field of Search ........... 114/235 R, 230, 235 A; 267/69, 70, 71, 72

[56] References Cited
UNITED STATES PATENTS

| | | | |
|---|---|---|---|
| 198,275 | 12/1877 | Chase | 267/70 |
| 207,904 | 9/1878 | Smalley | 267/71 |
| 593,788 | 11/1897 | Stone | 267/70 X |

FOREIGN PATENTS OR APPLICATIONS

| 347,212 | 4/1937 | Italy | 114/235 R |
|---|---|---|---|

Primary Examiner—Trygve M. Blix
Assistant Examiner—Gregory W. O'Connor
Attorney, Agent, or Firm—Gerald K. Kita

[57] ABSTRACT

A buoyant shock absorbing device for an aquatic tow rope having interchangeable component parts and a two piece housing having draining and venting apertures therein facilitating inspection of the component parts and serving as a gripping aid to assemble or dismantle the housing.

4 Claims, 2 Drawing Figures

U.S. Patent April 27, 1976 3,952,685
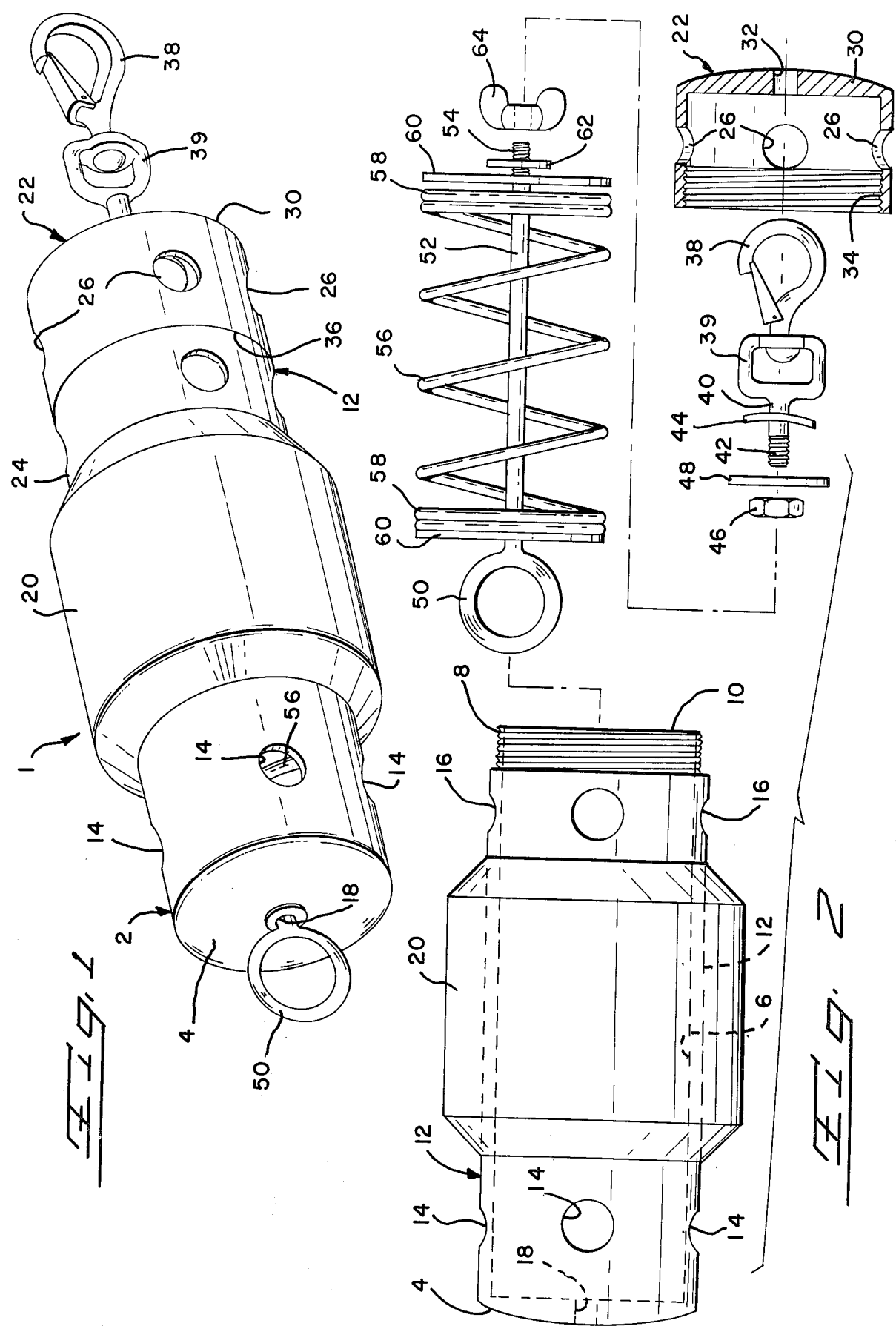

TOW ROPE DEVICE

FIELD OF THE INVENTION

The present invention relates to an improved shock absorber for an aquatic tow rope.

BACKGROUND OF THE PRIOR ART

In one type of shock absorber, a coiled length of tow rope is contained within an elastically extensible casing which expands and contracts in response to the amount of tension on the two rope. This type shock absorbing device does not have interchangeable parts and no provisions are made for water drainage and inspection of the component parts within the casing interior.

In another type of shock absorbing device a pair of concentric springs having different spring rates are contained within a casing which is in turn provided thereover with a buoyant envelope. In such a device the envelope must be removed to provide access to the component parts of the shock absorber. Whereas there are provided pressure release vents within the casing, there is no provision to permit venting and drainage through the buoyant envelope. In addition no positive gripping means are provided to facilitate assembly or disassembly of the device, for example, to incorporate interchangeable parts.

OBJECTS

Accordingly it is an object of the present invention to provide a shock absorbing device for a tow rope with a non-removable buoyant means and a two piece housing which has drain and vent apertures which also provide assistance to gripping the device during assembly and disassembly thereof.

Another object is to provide a shock absorbing device for a tow rope in which drain and vent apertures also facilitate inspection of the component parts as well as assistance to gripping the device during assembly and disassembly thereof.

Another object of the present invention is to provide a shock absorbing device for a tow rope which utilizes a two piece housing provided with a non-removable buoyant means and a series of drain and vent apertures as well as a parting seam spaced from the ends thereof to facilitate gripping at the apertures for ease in assembly and disassembly of the component parts.

Another object of the present invention is to provide a shock absorbing device for a tow rope having interchangeable parts.

Another object of the present invention is to provide a shock absorbing device for a tow rope which is buoyant, safe, has provisions for draining and venting water therefrom and is readily disassembled for interchanging component parts thereof.

Other objects and many attendant advantages will become apparent from the following detailed description taken in conjunction with the drawings.

DESCRIPTION OF THE DRAWINGS

FIG. 1 is a perspective of a shock absorbing device for a tow rope according to the present invention.

FIG. 2 is an elevation of the device shown in FIG. 1 with the component parts thereof in exploded configuration to illustrate the details thereof.

DETAILED DESCRIPTION

With more particular reference to the drawings there is illustrated generally at 1 a shock absorbing device particularly for an aquatic tow rope. The device includes an elongated cylindrical housing or casing 2 having a closed end 4 and an internal cylindrical cavity 6. An opposite end of the cylindrical housing portion 2 is of reduced cylindrical dimension and is externally threaded at 10. The end 8 is open for communication with the internal cavity 6. The cylindrical sidewall 12 of said housing portion 2 is provided with a plurality of spaced drain and vent apertures 14 encircling the housing portion 2 and located between said first end 4 and said threaded section 10. The sidewall 12 may also be provided with another optional set of drain and vent apertures 16 thereof adjacent to threaded section 10. The end 4 is provided with a central opening 18 therein. An annular collar 20 of flotation material is secured in encirclement about the sidewall 12. The collar 20 may be fabricated from styrene or urethane, molded in place or fabricated in the shape of a ring and slipped over the housing portion 2 and then cemented in place. The collar 20 is permanently affixed to the housing portion 2 leaving the apertures 14 and the optional apertures 16, if provided, exposed to allow venting and draining of the internal cavity 6. The collar also has chamfered edges 21 to minimize drag in water.

A cap portion 22 has a cylindrical sidewall 24 of the same external dimension as the sidewall 12. Sidewall 24 further includes a plurality of spaced vent and drain apertures 26 which communicate with the hollow interior of the cap portion 22. The cap portion 22 further is provided with an integral endwall 30 having a central aperture 32 therein communicating with the interior 28. The opposite end of the cap portion 22 is open and is internally threaded at 34 for threadable connection to the threaded section 10. When the cap portion is mounted to the housing portion the assembly is devoid of sharp edges or corners. A seam 36 is defined at the intersection of the cylindrical sidewall portions 12 and 24 and is substantially spaced from the end 30 of the cap portion. The cylindrical sidewall portion 24 thus is readily gripped to allow assembly and disassembly of the cap portion and housing portion 2. In addition the drain apertures 14 and 26 serve as recesses in the sidewalls 24 and 12 promoting gripping of the cap portion and housing portion to facilitate assembly or disassembly thereof. The drain apertures 14 and 26 thereby provide gripping means for each portion of the device 1.

The cap portion 22 has permanently attached thereto a clasp type eye or hook 38 having an integral shaft portion 40 which projects through the opening 32. The shaft 40 is threaded at 42 along a substantial length thereof. A formed arcuate washer 44 is slidably received over the shaft and is disposed as a cover over the aperture 32 and against the end 30 of the cap portion. A nut is threadably tightened to clamp the end 30 in position against the washer 44 and along the length of the shaft 40. An optional washer 48 may be placed under the nut. Accordingly the eye 38 is permanently secured to the end 30 of the cap portion 22.

A second eye 50 is provided with an elongated shaft 52 which is provided with threads 54 along the free and thereof. A resilient spring 56 having helical coils and generally circular end coils 58 is received over the shaft 52. A pair of enlarged washers 60 received over the shaft 52 provide end bearing plates for the coils 58. A washer 62 and a wing nut 64 are removably received over the threaded end 54 of the shaft 52. The spring 56 together with the shaft 52 are received within the internal cavity 6 of the housing portion 2 and the eye 50 projects outwardly from the aperture 18 of the end 4. The adjacent washer 60 adjacent to the eye 50 is disposed within the internal cavity 6 against the end 4. The washer 60 adjacent to the removable wing nut 64 serves as a piston slidably displacing within the housing portion 2 in response to tension applied to the ring or eyes 38 and 50. In use the clasp type eye or hook 38 is removably secured to a towing ring of an aquatic tow rope whereas the eye 50 is secured to the towing rope drawn by a watercraft. The coil spring 56 will compress or expand resiliently in response to the tension applied at the eyes 38 and 50.

The spring 56 may be readily replaced with another spring of any selected spring rate merely by disassembling the cap 22 and by removing the wing nut 64 and associated washer 62. The spring is readily visible and therefore subject to inspection through the drain apertures 14. The rod 52 is of a length such that the wing nut is disposed entirely within the housing portion such that if dropped the housing portion serves as a receptacle to catch the dropped wing nut preventing loss thereof.

The drain apertures 14 and 26 as well as the optional drain apertures 16 provided for water drainage and interventing of the housing thereby eliminate the need for any seals in the device. The drain apertures 14 will always be in different elevations in respect to one and other and are located toward the ends of the housing to insure venting and to eliminate water entrapment at all portions along the device. The apertures further provide visual inspection for the spring 56 and the shaft 52 for safety and identification purposes. The apertures further provide indentations in the cylindrical sidewalls of the cap and housing portion to provide grip means for ease in assembly or disassembly of the cap portion.

The flotation element is stationary on the device and is nonseparable therefrom to prevent loss thereof. The flotation element further is situated to expose the drain apertures. The flotation element further is situated in spaced relationship from the seam 36 to permit ready access to the component parts during assembly and disassembly thereof.

The housing is devoid of sharp edges and all the component parts have flush outer surfaces for safety reasons. The seam 36 is purposely spaced from an end of the device to promote gripping around the cylindrical sidewall and the drain apertures 26.

Although a preferred embodiment of the present invention has been shown and described other embodiments and modifications thereof are intended to be covered by the spirit and scope of the appended claims.

What is claimed is:

1. An aquatic tow rope shock absorbing device comprising:
    an elongated first cylindrical housing having a first end and a reduced externally threaded section,
    a cylindrical sidewall between said first end and said threaded section provided with drain apertures therein,
    a removable cap threadably received over said threaded section,
    an end wall of said cap having an eye means projecting therefrom for connection to an aquatic tow rope,
    a cylindrical sidewall of said cap provided with spaced drain apertures therein,
    a piston rod projecting through said first end and provided with an eye means for connection to an aquatic tow rope,
    said piston rod having a coil spring thereover,
    a piston on said piston rod and removable therefrom for assembly of said spring over said piston rod, and
    a collar of flotation material encircling and fixedly secured on said first cylindrical portion between said drain apertures and said threaded section, said spring being visible through said drain apertures and said apertures serving as gripping means during assembly or disassembly of said cap on said housing.

2. The structure as recited in claim 1 and further including: a threaded means removably connecting said piston and said piston rod.

3. The structure as recited in claim 1 wherein spring is positioned between said washers and is removably mounted on said piston rod.

4. The structure as recited in claim 1 wherein said cylindrical sidewall of said cap is flush with said cylindrical sidewall of said first housing portion.

* * * * *